(12) United States Patent
Auer et al.

(10) Patent No.: US 10,220,732 B2
(45) Date of Patent: Mar. 5, 2019

(54) MECHANICAL SEAT POSITION DETECTION

(71) Applicant: Magna Seating (Germany) GmbH, Sailauf (DE)

(72) Inventors: Florian Auer, München (DE); Christoph Brehm, Münster (DE); David Preisser, Fürth (DE); Andreas Wachtel, Lohr (DE); Bernd Efler, Waldems (DE)

(73) Assignee: Magna Seating (Germany) GmbH, Sailauf (DE)

( * ) Notice: Subject to any disclaimer, the term of this patent is extended or adjusted under 35 U.S.C. 154(b) by 56 days.

(21) Appl. No.: 15/628,863

(22) Filed: Jun. 21, 2017

(65) Prior Publication Data

US 2017/0368962 A1 Dec. 28, 2017

(30) Foreign Application Priority Data

Jun. 23, 2016 (DE) .................. 10 2016 211 299

(51) Int. Cl.
*B60N 2/07* (2006.01)
*B60N 2/08* (2006.01)
*B60N 2/02* (2006.01)
*B60N 2/90* (2018.01)

(52) U.S. Cl.
CPC ......... *B60N 2/0727* (2013.01); *B60N 2/0735* (2013.01); *B60N 2/0843* (2013.01); *B60N 2/0232* (2013.01); *B60N 2/929* (2018.02); *B60N 2002/924* (2018.02); *B60N 2002/948* (2018.02)

(58) Field of Classification Search
CPC .. B60N 2/0727; B60N 2/0735; B60N 2/0843; B60N 2/929; B60N 2002/924; B60N 2002/948; B60N 2/0232; B60N 2/0248; B60N 2/123; B60N 2/232; B60N 2/2354; B60N 2/2358
See application file for complete search history.

(56) References Cited

U.S. PATENT DOCUMENTS

| 5,873,629 | A | * | 2/1999 | Schuler | ............... | B60N 2/0818 |
|---|---|---|---|---|---|---|
| | | | | | | 248/430 |
| 6,799,800 | B2 | * | 10/2004 | Klahold | ............... | B60N 2/0248 |
| | | | | | | 297/341 |
| 7,438,359 | B2 | * | 10/2008 | Klahold | ............... | B60N 2/0818 |
| | | | | | | 248/429 |
| 7,726,741 | B2 | * | 6/2010 | Klahold | ................. | B60N 2/123 |
| | | | | | | 297/341 |

(Continued)

FOREIGN PATENT DOCUMENTS

| DE | 69008105 T2 | 7/1994 |
|---|---|---|
| DE | 10202179 A1 | 8/2003 |
| WO | 2016162276 A1 | 10/2016 |

*Primary Examiner* — Philip F Gabler
(74) *Attorney, Agent, or Firm* — Jordan IP Law, LLC; Todd A. Vaughn (57) ABSTRACT

A seat position detection apparatus for a vehicle seat which is guided using a seat rail in a floor rail of the vehicle. The seat position detection apparatus has a lock for the longitudinal setting of the seat rail and the floor rail in relation to one another, and a mechanical memory device that has a position determination unit and a position detection unit, which may be started symmetrically from both directions of the longitudinal adjustment of the vehicle seat to define a vehicle seat position.

16 Claims, 5 Drawing Sheets

(56) References Cited

U.S. PATENT DOCUMENTS

| | | | | |
|---|---|---|---|---|
| 7,812,600 B2* | 10/2010 | Ito | ............ | B60N 2/0232 |
| | | | | 250/231.13 |
| 7,926,875 B2* | 4/2011 | Schmale | ............ | B60N 2/123 |
| | | | | 297/344.11 |
| 8,939,423 B2* | 1/2015 | Wojatzki | ............ | B60N 2/0818 |
| | | | | 248/424 |
| 9,393,881 B2* | 7/2016 | Joern | ............ | B60N 2/0248 |
| 2017/0106771 A1* | 4/2017 | Bonk | ............ | B60N 2/06 |

* cited by examiner

MECHANICAL SEAT POSITION DETECTION

CROSS-REFERENCE TO RELATED APPLICATIONS

The present application claims priority under 35 U.S.C. § 119 to German Patent Application DE 102016211299.6 (filed on Jun. 23, 2016), which is hereby incorporated by reference in its entirety.

TECHNICAL FIELD

Embodiments relate to mechanical seat position detection for a vehicle seat which is guided using a seat slide rail in a floor rail of the vehicle, having a lock for the longitudinal setting of the rails in relation to one another.

BACKGROUND

So that an optimum seat position may be set, vehicle seats for drivers and passengers are arranged on the vehicle floor in a longitudinally displaceable manner via a rail system. It is known that the object of a seat arrangement with seat position detection and a memory function is to store at least one position found to be favourable through a previous seat adjustment. Electrically or electronically operated memory devices which store a plurality of seat positions, so for different drivers, for example, and which allow setting by the push of a button are known in the art. In addition, mechanical memory devices have also been disclosed which only allow one seat position to be stored, so, for example, make it possible for a given driver to relocate the optimum seat position by simply moving the seat until a stored locking position is reached, without having to adjust the seat all over again.

German Patent Publication No. DE 43 33 892 A1 discloses a manually actuable mechanical memory device for storing two individually programmable seat positions, in particular, longitudinal seat positions, using slider-bearing slider rails running substantially in the adjustment direction and a stop element that may be brought into engagement with the slider and is movable transversely to the slider rail, which stop element is an integral part of a searcher programming unit. In this case, either the search programming unit or the slider rail is movably coupled to the seat frame, while the other part in each case is fixed relative to the vehicle floor. The stop member may be moved upon actuation of the unlocking device of the seat adjustment from a neutral position into a stop position, in which the stop member may come into contact with a stop surface acting on one side of a slider during adjustment of the seat position and adjusting action in the direction taken is thereby ended.

Longitudinal adjustment, however, may only ever be realized in the direction of the stop of the individual slider or, when there is a two-slider configuration, between said sliders.

Furthermore, memory functions with mechanical solutions are known from the field of easy-entry adjusters. These are vehicle seats which may be unlocked from their guide, so that it is easier for a passenger to reach the back seat. The only point of significance here is that the seat relocates the previously set position, wherein the displacement is always in a direction towards the memory unit.

The devices, such as those described in German Patent Publication No. DE 1020133203181 A1, for example, only ever allow the seat to be pushed completely forward in the direction of the front of the vehicle and then this displacement path to be precisely covered, in order to relocate the seat position that has been set.

SUMMARY

The problem addressed by embodiments is that of creating a seat arrangement with a manual mechanical adjustment device and seat position detection with memory function which allows a previously set seat position individually adapted to a user in question to be relocated quickly and conveniently from both possible sides of the longitudinal adjustment of the rail system.

Furthermore, a problem addressed by the invention is that of configuring a seat position detection system with a memory function in such a manner that it may be attached to customary rail systems for motor vehicles or may be integrated in the rail.

The problem is solved by a mechanical seat position detection system for a vehicle seat with a rail system comprising a floor rail attached in a vehicle-fixed manner and a seat rail that may be mounted displaceably along the floor rail, having a lock for the longitudinal setting of the rails in respect of one another, wherein a mechanical memory device comprising a position determination unit and a position detection unit is attached, which may be started symmetrically from both directions of the longitudinal adjustment of a vehicle seat and defines a seat position.

The advantage of this is that the seat position once fixed is relocated purely mechanically from both extreme sides of a seat adjustment.

The longitudinal direction corresponds to the x-direction, the transverse direction corresponds to the y-direction, the vertical direction corresponds to the z-direction in the description and the associated drawings.

The term "engaged" refers to both a direct and also an indirect form-fitted connection.

DRAWINGS

Embodiments will be illustrated by way of example in the drawings and explained in the description below.

FIG. 5a illustrates a perspective partial detail of the rail system in the region of a longitudinal adjustment and locking unit, in accordance with embodiments.

DESCRIPTION

All figures in the application are diagrams intended to depict the seat position detection with memory function in the region of a rail system. The associated description does not deal with the complete functionality of an adjustable vehicle seat. In particular, the drawings do not depict any levers or cables which are necessary in order to achieve the locking and unlocking of the components.

Figure 1:
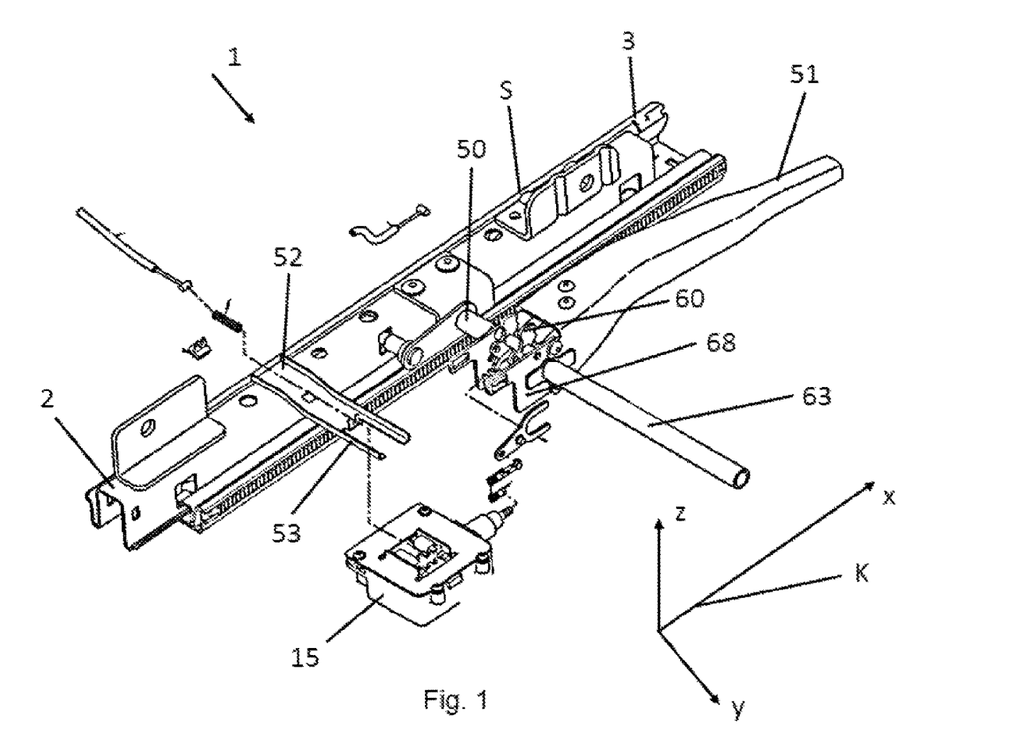
FIG. 1 illustrates a perspective view of a partial region of a rail system, in accordance with embodiments.

FIG. 1 illustrates as a partial perspective view an embodiment of a mechanical adjustment mechanism and seat position detection with memory function. A coordinate system K illustrated herein denotes the directions.

The subassemblies of the seat position detection 1 in accordance with embodiments include the rail system S, a memory device 15 with a position detection unit 7 and a position determination unit 6, a locking unit 50 with longitudinal adjustment lever 51 and also an uncoupling unit 60.

A vehicle seat which is not illustrated is attached to the vehicle body in a longitudinally displaceable manner, i.e., in an x-direction, via the rail system S which exhibits two pairs of seat rails running in parallel. Each pair of seat rails has a floor rail 3 attached in a vehicle-fixed manner, and also a seat rail 2 attached to the vehicle seat mounted in a longitudinally displaceable manner on the floor rail 3. FIG. 1 illustrates a pair of seat rails. The position of the vehicle seat may be locked via the locking unit 50 arranged in the region of the pairs of seat rails, wherein the lock may be released via the pivotably attached longitudinal adjustment lever 51 by a passenger and the seat may be moved along the structure-fixed floor rail 3. The guide between the floor rail 3 and seat rail 2 is not described in greater detail, as it is generally known in the art and may be used in different embodiment variants.

The floor rail 3 has on its side face pointing towards the opposite floor rail of the rail system S a toothed strip 24 running in the longitudinal direction. The seat rail 2 has a retaining and adjusting strip 52 for the displaceable mounting of the memory device 5 in the x-direction. The retaining and adjusting strip 52 is connected to the seat rail 2; the retaining and adjusting strip 52 is preferably welded on. The retaining and adjusting strip 52 is designed as a plate-shaped element and has two retaining rails 53 which project beyond the peripheral region of the seat rail 2 into the space between the two pairs of seat rails spaced apart in parallel from the vehicle floor. For mounting on the retaining and adjusting strip 52, the memory device 5 has corresponding adjusting strips 53a. Details of these may be seen in FIG. 2.

Figure 2:
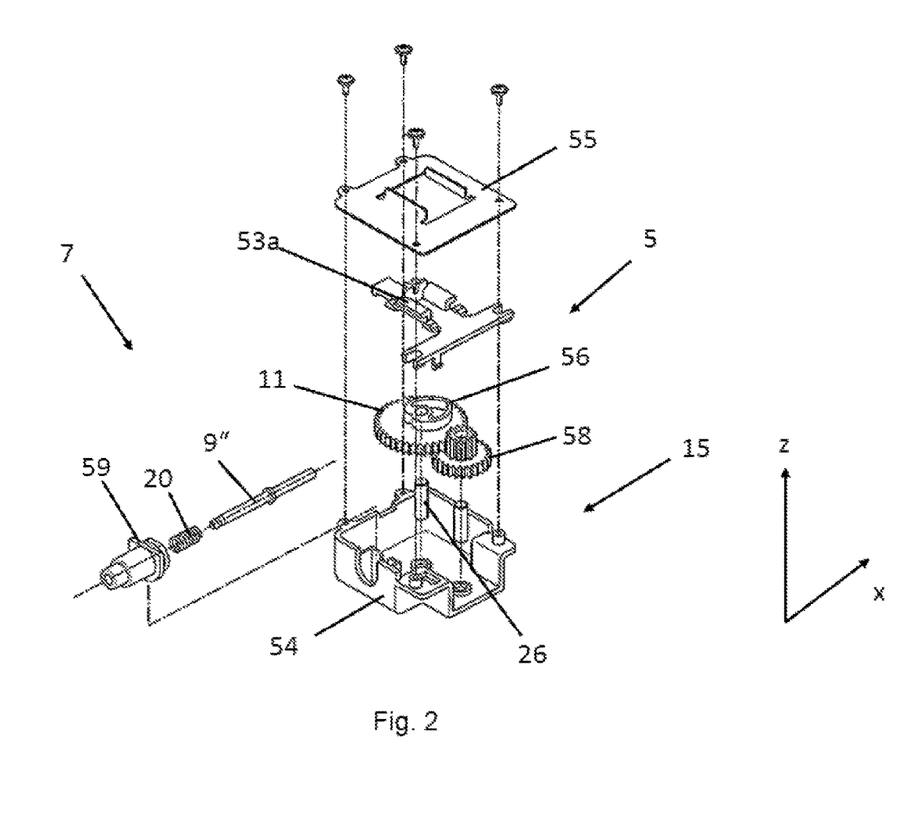
FIG. 2 illustrates an exploded view of a memory block with a position determination unit and a position detection unit, in accordance with embodiments.

FIG. 2 illustrates as an exploded view the memory device 5 which comprises a memory block 15 configured as a position determination unit 6, and also a position detection unit 7. The memory block 15 has a housing 54 and a housing cover 55. In the housing 54, a memory wheel 11 is rotatably mounted about a shaft 26. The memory wheel 11 has a control block on its side face pointing upwards in the z-direction, which control block has a control cam 56 with a heart-shaped profile as a position determination unit.

The control cam 46 is configured in such a manner that it comprises two curves symmetrical to the centre line B, on which one point which runs along the curve moves to or from the axis of rotation. The control cam 56 has an indentation 57. It may be seen from FIG. 3c that in the region of the lowest point of the indentation 57, the distance from the centre line of the shaft 26 (distance A) compared with the other peripheral points on the control cam 56 is smallest.

Figure 3A:
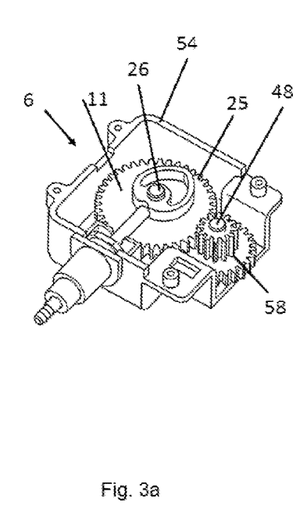
FIG. 3a illustrates a perspective view of the memory block without a housing cover, in accordance with embodiments.
Figure 3B:
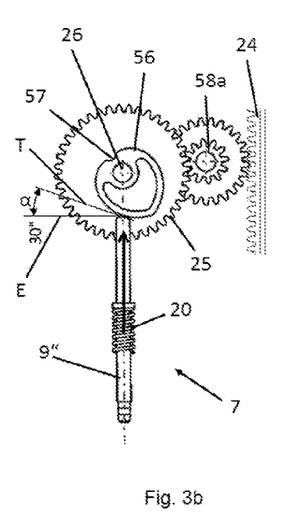
FIG. 3b illustrates a schematic representation of an arbitrary position of the position determination and position detection unit, in accordance with embodiments.

The memory wheel 11 has wheel gearing 25 which is engaged via a wheel gearing 58a of a gearwheel stage 58 mounted on a shaft 48. The gearwheel stage 58 may be engaged with the toothed strip 24. A drive-effective connection between the memory wheel 111 and floor rail 3 may also be made via a frictional connection. In this case, FIG. 3b illustrates the situation in which the memory wheel 11 is engaged with the toothed strip 24 via the gearwheel stage 58. When the seat rail 2 is displaced along the floor rail 3, the memory wheel 11 rotates through the engaged gearwheel stage meshed with the floor rail in a defined transmission ratio to the floor rail. This arrangement means that an angle of rotation of the memory wheel 11 is assigned to a position of the floor rail 3 in respect of the seat rail 2.

Figure 3C:
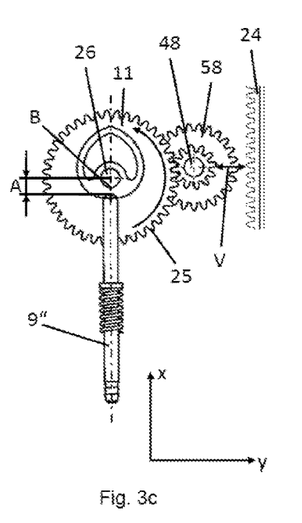
FIG. 3c illustrates a schematic representation of the position determination and position detection unit in a position for fixing a memory position, in accordance with embodiments.

FIG. 3c illustrates a position in which the engagement is released. This is achieved by an adjustment of the memory block 15 along the retaining and adjusting strip 52 in the y direction. The adjusting movement of the memory block 15 is indicated by the arrow V in FIG. 3c. The adjustment is activated in this case via a Bowden cable or a lever system. In this position, the gearwheel stage 58 does not mesh with the toothed strip 3 and a memory position may be set—as described in greater detail later.

As illustrated in FIG. 2, the memory device 5 comprises the position detection unit 7 which comprises a detection pin 9", a spring 20 and a cylindrical housing 59. The detection pin 9" extends perpendicularly to the axis 26 in respect of the memory wheel 11 and abuts the control cam 56 in a pretensioned manner via the spring 20. The detection pin 9" with the spring 20 is mounted in the housing 59 which is fixed on the housing 54. In an embodiment which is not illustrated, the detection pin 9" may also be arranged in a parallel plane to the shaft 26, then the design of the control cam must be adapted accordingly.

In order for a new memory position to be set by a passenger, the memory block 15 is moved away from the toothed strip 24 in the direction of the arrow V, as a result of which the gearwheel stage 58 becomes disengaged from the toothed strip 24. The compression spring 20 presses the detection pin 9" against the control cam 56 and the resulting force rotates the memory wheel 11 about its shaft 26. In this case, the control cam is designed in such a manner that in any arbitrary angle position of the memory wheel 11, an alpha angle of 30 degrees (see drawing) between a tangent T on the periphery of the control cam and a plane E running in the y direction perpendicular to the tip or end region of the detection pin 9" is present, so that a resulting force acts in such a manner that the memory wheel rotates in the direction of the position illustrated in FIG. 3c. The rotation of the memory wheel 11 ends when the detection pin 9" is located in the position illustrated in FIG. 3c, where it engages with the indentation 57. The gearwheel stage 58 is then connected to the toothed strip 24 of the floor rail 3 again and the memory position is thereby fixed.

In order to relocate the seat position (memory position), the user moves the vehicle seat relative to the floor rail up to a stop between the seat rail and the floor rail via the locking unit of the rail system.

Figure 5A:
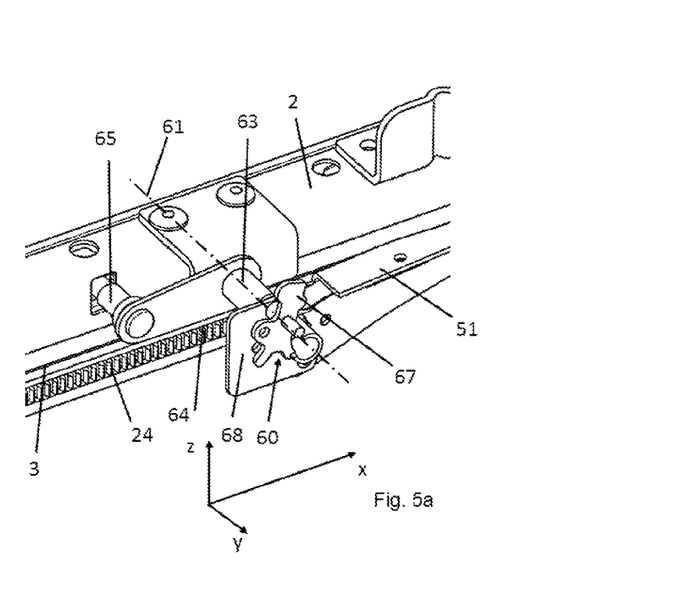
FIGS. 5b & 5c respectively illustrate a schematic representation of the longitudinal adjustment lever in two positions, in accordance with embodiments.

In order to adjust the seat along the floor rail 3, the user must initially pivot the longitudinal adjustment lever 51 upwardly about a shaft 61. The shaft 61 is oriented in the y-direction. The pivoting movement is illustrated by the arrow 62. The longitudinal adjustment lever 51 is rotatably mounted on a pipe 63 for this purpose. The pipe 63 is rotatably mounted at each end on the seat rails 2 arranged spaced apart in parallel. For this purpose, the pipe 63 is welded to a first end region of a tab 64. The tab 64 is connected to a bolt 65 at the opposite second end region. The tab 64 is coupled via the bolt 65 with the locking unit 50. The locking unit 50 is generally known to the person skilled in the art and will not be described in greater detail here. The locking unit 50 is integrated between the seat and floor rail and unlocks the mechanism when the longitudinal adjustment lever 51 is pulled up. After unlocking, the seat may be moved along the floor rail 3.

Figure 4:
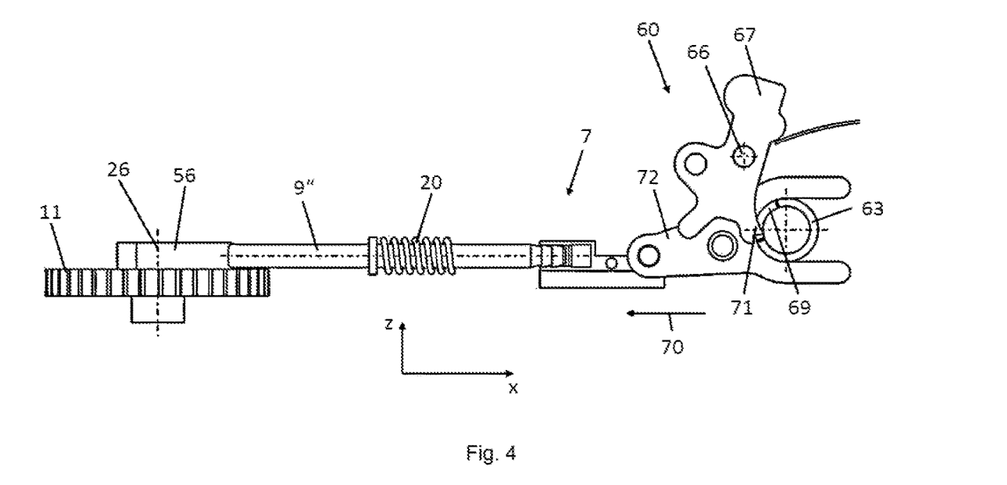
FIG. 4 illustrates a view of the memory wheel, the position detection unit, and an uncoupling unit, in accordance with embodiments.

An uncoupling unit 60 is arranged between the longitudinal adjustment lever 51 and the locking unit 50. The uncoupling unit 60 substantially comprises a catch 67 rotatably mounted via a shaft 66. The catch 67 in this case is mounted in bearing plates 68 arranged spaced apart from one another, wherein the bearing plates enclose the pipe and are attached to the longitudinal adjustment lever 51. In the normal position of use, the catch 67 engages via an engagement cam 71 with a recess 69 in the pipe 63. A form-fitted connection is engaged between the pipe 63 and the longitudinal adjustment lever 51. When the memory position in which the detection pin 9" engages with the indentation 57 in the control cam is reached, the connection between the longitudinal adjustment lever 51 and the tab 64 connected to the locking mechanism 50 is separated. In this position, the detection pin 9" is located in a position displaced to the left along the x-axis in the direction of the arrow 70. In this position, the catch 67 is pivoted about the shaft 66 and the engagement cam 71 comes out of engagement with the recess 69 in the pipe 63. Consequently, the locking unit 50 locks the seat rail 2 in the floor rail 3.

Figure 5B:
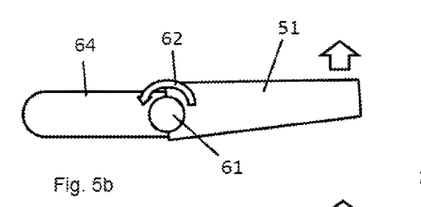
Figure 5C:
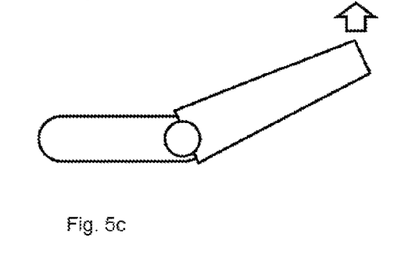

In this position, the user may once again release the longitudinal adjustment lever 51 which has been pulled upwards, so that it pivots into the initial position illustrated in FIG. 5*b*.

If, when the vehicle seat is adjusted along the rail system, it is not moved into the preset memory position, the uncoupling unit 60 must be deactivated. This takes place by locking the catch 67, so that it is no longer rotatable on the shaft 66.

The term "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

What is claimed is:

1. A seat position detection apparatus for a vehicle seat which is guided using a seat rail in a floor rail of the vehicle, the seat position detection apparatus comprising:
    a locking unit to longitudinally set the seat rail and the floor rail relative to one another; and
    a memory device including an uncoupling unit, a position detection unit having a position detection pin, a spring, and a position determination unit having a memory block with wheel gearing and a memory wheel to engage a toothed strip of the floor rail via the wheel gearing, the position determination unit to define a memory position of the vehicle seat via release of the engagement between the memory wheel and the toothed strip, the memory block including a control cam arranged on a side face of the memory wheel, the control cam having an indentation to be engaged by the position detection pin in a pretensioned manner by the spring over a first end region and thereby fix the memory position.

2. The seat position detection apparatus of claim 1, wherein the position detection pin is connected to an actuating element of the uncoupling unit via a second end region.

3. The seat position detection apparatus of claim 2, wherein the uncoupling unit comprises a catch rotatably mounted via a shaft.

4. The seat position detection apparatus of claim 3, wherein the catch has an engagement cam configured to permit engagement of the catch and a recess in a shaft connected to the locking unit in a detachable manner.

5. The seat position detection apparatus of claim 2, wherein the position detection pin is configured for detachable connection to the catch via the actuating element.

6. The seat position detection apparatus of claim 5, wherein the catch is to be disengaged from the shaft when the position detection pin engages the indentation and is connected to the catch.

7. A seat position detection apparatus for a vehicle seat which is guided using a seat rail in a floor rail of the vehicle, the seat position detection apparatus comprising:
    a memory device including:
        a position detection unit including a position detection pin; and
        a position determination unit including wheel gearing and a memory wheel to engage a toothed strip of the floor rail via the wheel gearing, the position determination unit to define a memory position of the vehicle seat via release of the engagement between the memory wheel and the toothed strip, the memory block including a control cam having an indentation to be engaged by the position detection pin in a pretensioned manner and thereby fix the memory position.

8. The seat position detection apparatus of claim 7, wherein the uncoupling unit comprises a catch rotatably mounted via a shaft.

9. The seat position detection apparatus of claim 8, wherein the catch has an engagement cam configured to permit engagement of the catch and a recess in a shaft connected to the locking unit in a detachable manner.

10. The seat position detection apparatus of claim 9, wherein the position detection pin is configured for detachable connection to the catch via the actuating element.

11. The seat position detection apparatus of claim 10, wherein the catch is to be disengaged from the shaft when the position detection pin engages the indentation and is connected to the catch.

12. A vehicle seat, comprising:
    a floor rail;
    a seat rail in the floor rail to guide the vehicle seat; and
    a seat position detection apparatus configured to detect a position of the vehicle seat, the seat position detection apparatus including:

a memory device including a position detection unit including a detection pin and a position determination unit including wheel gearing and a memory wheel to engage a toothed strip of the floor rail via the wheel gearing, the position determination unit to define a memory position of the vehicle seat via release of the engagement between the memory wheel and the toothed strip, the memory block including a control cam having an indentation to be engaged by the detection pin in a pretensioned manner and thereby fix the memory position.

13. The vehicle seat of claim 12, wherein the uncoupling unit comprises a catch rotatably mounted via a shaft.

14. The vehicle seat of claim 13, wherein the catch has an engagement cam configured to permit engagement of the catch and a recess in a shaft connected to the locking unit in a detachable manner.

15. The vehicle seat of claim 14, wherein the position detection pin is configured for detachable connection to the catch via the actuating element.

16. The vehicle seat of claim 15, wherein the catch is to be disengaged from the shaft when the position detection pin engages the indentation and is connected to the catch.

* * * * *